United States Patent
Beltrandi

(10) Patent No.: US 6,652,259 B1
(45) Date of Patent: Nov. 25, 2003

(54) MOLD FOR MANUFACTURING PLASTIC ITEMS

(75) Inventor: Dario Beltrandi, Imola (IT)

(73) Assignee: Sacmi Cooperativa Meccanici Imola S.c.r.l., Imola (IT)

( * ) Notice: Subject to any disclaimer, the term of this patent is extended or adjusted under 35 U.S.C. 154(b) by 0 days.

(21) Appl. No.: 09/807,618

(22) PCT Filed: Nov. 15, 1999

(86) PCT No.: PCT/EP99/08770

§ 371 (c)(1),
(2), (4) Date: Apr. 16, 2001

(87) PCT Pub. No.: WO00/30825

PCT Pub. Date: Jun. 2, 2000

(30) Foreign Application Priority Data

Nov. 26, 1999 (IT) ..................... B098A000659

(51) Int. Cl.[7] ..................... B29C 33/30; B29C 43/36
(52) U.S. Cl. ..................... 425/349; 425/412; 425/423; 425/443
(58) Field of Search ..................... 425/408, 412, 425/348 R, 349, 422, 443, 423, 809

(56) References Cited

U.S. PATENT DOCUMENTS

| 3,313,875 A | 4/1967 | Magerle | 425/129.1 |
| 4,519,569 A | * 5/1985 | Nolan | 425/443 |
| 4,640,673 A | * 2/1987 | Takeda et al. | 425/408 |
| 5,211,798 A | * 5/1993 | Keller | 425/576 |
| 5,786,079 A | 7/1998 | Alieri | 425/349 |

FOREIGN PATENT DOCUMENTS

| DE | C-40 09 661 | 3/1991 |
| FR | A-660 483 | 7/1929 |

\* cited by examiner

*Primary Examiner*—Robert Davis
*Assistant Examiner*—Thu Khanh T. Nguyen
(74) *Attorney, Agent, or Firm*—Guido Modiano; Albert Josif; Daniel J. O'Byrne

(57) ABSTRACT

A mold for manufacturing plastic items, composed of a female mold half and of a male mold half which are mutually aligned along a vertical axis, the male mold half being composed of a sleeve and a plug which is guided inside the sleeve and is movable with respect thereto; the female mold half comprises a base plate, a bush which is guided on the base plate and forms, together with the base plate, a cavity for receiving a dose of plastic material to be molded, the bush being provided with an abutment which acts as a locator for the sleeve during molding, the bush being movable with respect to the base plate in contrast with elastic return means which allow the plug to enter said cavity.

3 Claims, 2 Drawing Sheets

MOLD FOR MANUFACTURING PLASTIC ITEMS

BACKGROUND OF THE INVENTION

The present invention relates to a mold for manufacturing plastic items, particularly screw caps.

Various processes and machines for pressure-molding plastic items are known; one of these machines is known for example from WO 96/09153 in the name of this same Applicant and comprises a carousel which can rotate about a vertical axis and on which a plurality of angularly spaced molding units are mounted. Each unit comprises an upper male mold half which is aligned with a lower female mold half. A dose of semi-fluid plastic material is fed into the molding cavity of said female mold half and is pressed by means of a relative movement of the two mold halves.

When the items to be manufactured have a limited height in the molding direction and therefore the cavity of the female mold half has a shallow containment wall, problems can arise in retaining the dose of plastics within the cavity. The dose deposited in the molding cavity, being subjected to centrifugal force, in fact tends to escape radially and to remain trapped between the male mold half and the female mold half, forming flash.

SUMMARY OF THE INVENTION

The aim of the present invention is to obviate the above-noted drawbacks of conventional devices, i.e., to provide a mold for manufacturing plastic items, particularly caps, which allows to retain within the cavity of the female mold half the dose of semi-fluid plastic material independently of the final shape of the manufactured item without this detracting from the precision of the centering between the male mold half and the female mold half.

Within the scope of this aim, an object of the present invention is to provide a mold which is simple, relatively easy to provide in practice and applicable to conventional devices without having to resort to substantial modifications thereof.

This aim is achieved by the present mold for manufacturing plastic items, composed of a female mold half and of a male mold half which are mutually aligned along a vertical axis, said male mold half being composed of a sleeve and a plug which is guided inside said sleeve and is movable with respect thereto, characterized in that said female mold half comprises a base plate, a bush which is guided on said base plate and forms, together with said base plate, a cavity for receiving a dose of plastic material to be molded, said bush being provided with an abutment which acts as a locator for said sleeve during molding, said bush being movable with respect to said base plate in contrast with elastic return means which allow said plug to enter said cavity.

BRIEF DESCRIPTION OF THE DRAWINGS

Further characteristics and advantages of the present invention will become apparent from the following detailed description of a preferred but not exclusive embodiment of a mold according to the present invention for manufacturing plastic caps, illustrated in the accompanying drawings, wherein.

DESCRIPTION OF THE PREFERRED EMBODIMENTS

Figure 1:
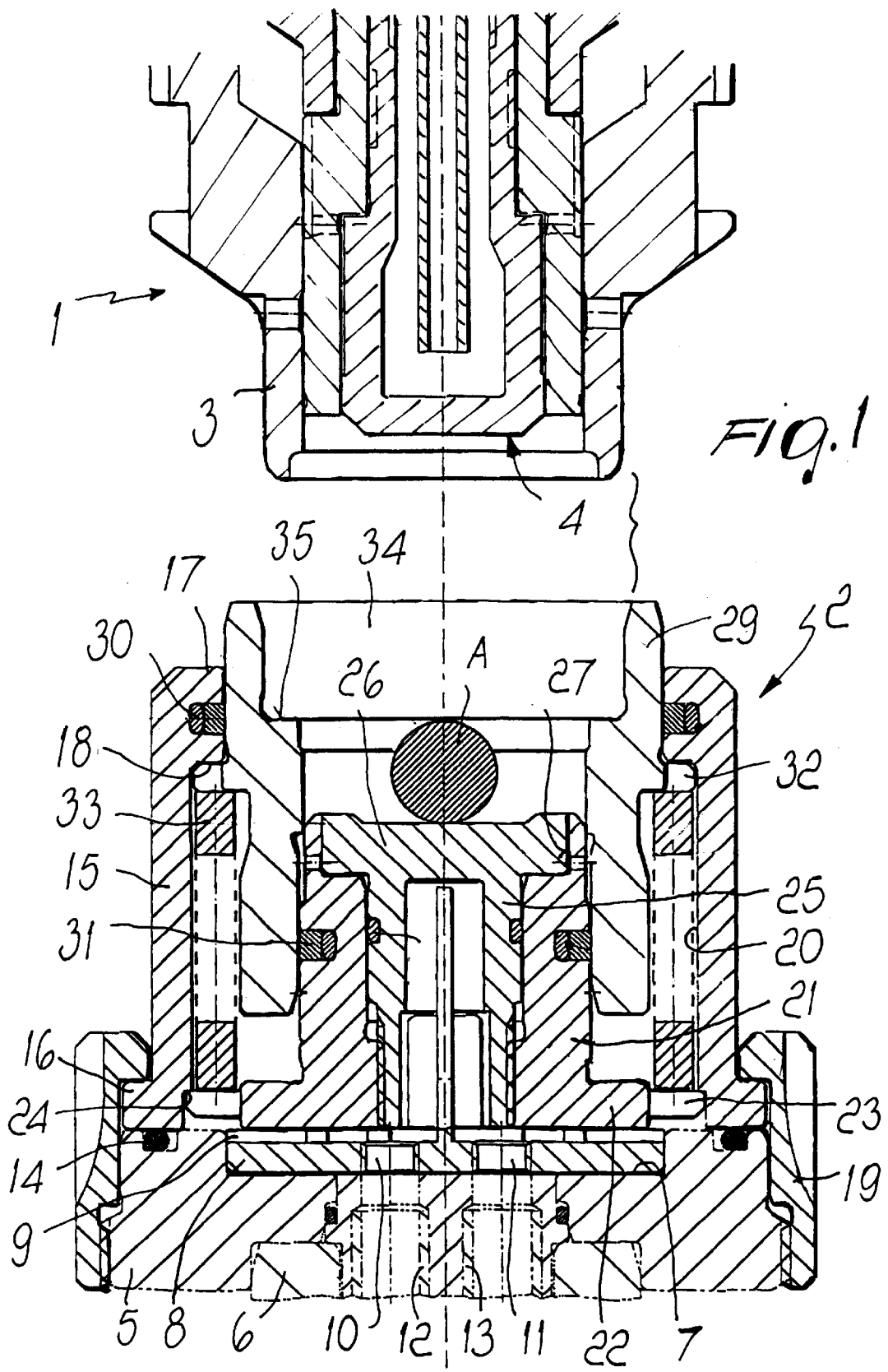
FIG. 1 is a longitudinal sectional view of the male mold half in the position for loading a dose of plastic material, above the female mold half.

The apparatus is composed of a carousel which can rotate about a vertical axis and supports, in its peripheral region, a plurality of molding units which are composed of an upper male mold half and of a lower female mold half, generally designated by the reference numerals 1 and 2 respectively. The male mold half 1 comprises an external sleeve 3 which is accommodated in a cylindrical seat of the supporting structure of the carousel and inside which a plug 4 can slide.

Further details on the structure of the carousel and of the male mold half 1 are contained in the already-mentioned WO 96/09153, which is referenced herein for the sake of brevity in description.

The female mold half 2 is composed of a plate 5 which is fixed to the top of a stem 6 and is provided with an external thread. The stem 6 is guided in the lower part of the carousel and is actuated upward and downward by means of hydraulic cylinders so as to move the female mold half 2 into abutment against the male mold half 1 during molding and move it away from said male mold half in order to allow to remove the molded item.

A seat 7 is formed in the plate 5, and a disk 8 is arranged in the seat; radial millings 9 are provided on the upper face of disk 8. The millings 9 are connected, by means of openings 10, 11 of the disc 8, to two respective ducts 12, 13 which run inside the tubular stem and are used to supply and drain a liquid for cooling the mold half 2.

A sleeve 15 is-arranged on the plate 5, with a sealing ring 14 interposed, and is provided with an external collar 16 in a downward region and, in an upward region, with an internal collar 17 which forms a shoulder 18.

A ring 19 acts on the lower collar 16 and is screwed onto the external peripheral region of the plate 5, locking the sleeve 15.

The sleeve 15 encloses a chamber 20 which centrally accommodates a tubular stem 21 which rests against the disk 8 by means of a flange 22. A plurality of angularly spaced wings 23 protrude radially outward from the flange 22 and are locked, by means of their ends, below a shoulder 24 which is formed inside the sleeve. 15 at the level of the lower collar 16.

A tubular shank 25 is screwed into the tubular stem 21 and is provided at the top with a base plate 26 which is accommodated in a seat 27 formed at the top of the tubular stem 21. A sealing ring 28 is arranged between the internal surface of the stem 21 and the outer surface of the shank 25.

The reference numeral 29 designates a bush which is externally guided in the upper collar 17 with an annular sealing gasket 30 interposed and is internally guided on the tubular stem 21 with an annular sealing gasket 31 interposed.

The bush 29 is provided with an external toothed ring 32 which is suitable to abut against the collar 17 of the sleeve 15 in order to determine the upward stroke limit position of the bush 29.

The bush 29 forms, together with the sleeve 15, an interspace which accommodates a spring 33 which acts by compression and rests, in a downward region, against the wings 23 of the flange 22 and rests, in an upward region, against the ring 32; the spring 33 keeps the bush 29 elastically rested against the collar 17.

In this resting position, the bush 29 encloses, together with the base plate 26, a cavity 34 for receiving a dose A of plastic material to be molded. The shape of the cavity 34, of the plug 4 of the sleeve 3 determines the final shape of the product. In the illustrated example, the internal wall of the bush 29, which rises from the base plate 26 when the bush 29 is in abutment against the collar 32, has a first portion which can be engaged by the plug 4 and a second portion whose diameter is suitable to allow sliding coupling to the sleeve 3. The two portions are mutually separated by a shoulder 35 which is adapted to act as an abutment for the edge of the sleeve 3.

The operation of the above-described mold is as follows. During loading, the dose A of semi-fluid plastic material is introduced in the receiving cavity 34 of the female mold half 2, which in this step is spaced from the male mold half 1. It should be observed that the wall of the bush that rises from the base plate 26 is high enough to prevent the dose A from being propelled out of the cavity 34 due to the centrifugal force produced by the rotation of the mold halves 1 and 2 and from contaminating the mating region of the male and female mold halves.

Figure 2:
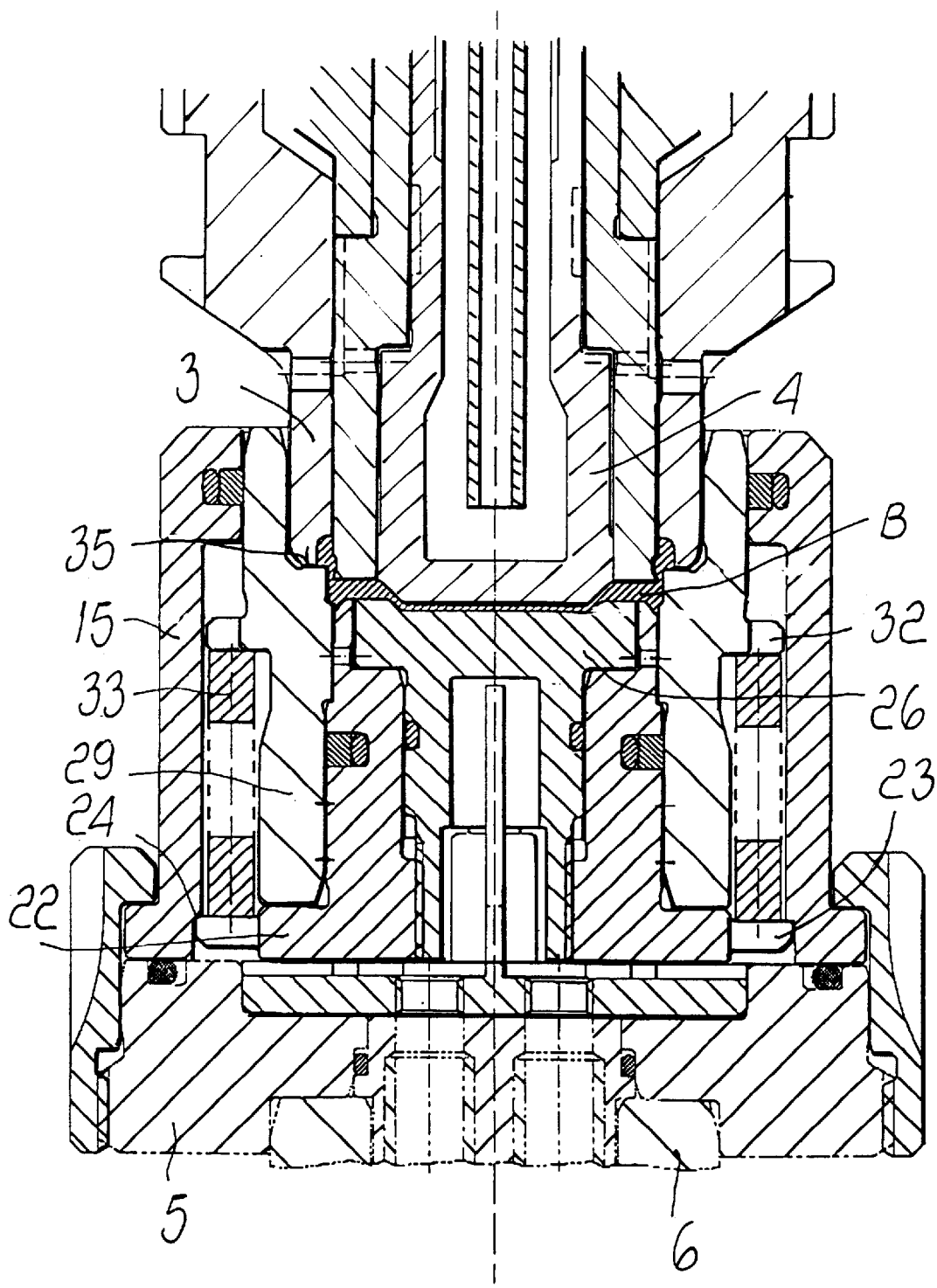
FIG. 2 is a longitudinal sectional view of the mold in the molding position.

After loading the dose of plastics, the plate 5 is actuated so as to rise, moving toward the male mold half 1. Correct centering between the two mold halves 1 and 2 ensures the insertion of the sleeve 3 in the cavity 34 until the sleeve 3 abuts against the abutment 35. As the mutual approach of the mold halves 1 and 2 continues, the bush 29 is pushed into the chamber 20 in contrast with the return action applied by the spring 33, allowing the plug 4 to compress the dose A and form a cap B (see FIG. 2). The cooling liquid that flows from the ducts 12 and 13 through the millings 9 and the spaces between the wings 13 in the chamber 20 ensures the setting of the plastics.

It is evident that the telescopic structure of the bush 29 allows to obtain two operating conditions of the female mold half 2: one for receiving the plastic material, in which, as already described, the bush protrudes beyond the base plate 26 and forms a cavity which is suitable to ensure retention of the dose without any danger of escape, and a molding condition in which the bush forms the moldings cavity, which is much shallower than the receiving cavity 34.

This telescopic structure of the bush allows to mold particularly shallow caps, for which, if conventional molds are used instead, the wall of the molding cavity of the female mold half would not be high enough to retain the dose of plastics.

The disclosures in Italian Patent Application No. B098A000659 from which this application claims priority are incorporated herein by reference.

What is claimed is:

1. A mold for manufacturing plastic items, composed of a female mold half and of a male mold half which are mutually aligned along a vertical axis, said male mold half being composed of a sleeve and a plug which is guided inside said sleeve and is movable with respect thereto, wherein said female mold half comprises a base plate, a bush which is guided on said base plate and forms, together with said base plate, a cavity for receiving a dose of plastic material to be molded, said bush being provided with an abutment which acts as a locator for said sleeve during molding, said bush being movable with respect to said base plate in contrast with elastic return means which allow said plug to enter said cavity, the mold further comprising a sleeve which is arranged on said plate and is provided with an external collar in a downward region and, in an upward region, with an internal collar which forms a shoulder which acts as an upward locator for said bush, a ring being provided which is screwed onto the external peripheral region of said plate and acts on said external collar in order to lock said sleeve on said plate, said sleeve being provided with an internal shoulder for the axial locking of a flange of a stem for supporting said base plate.

2. The mold according to claim 1, wherein said bush is provided with an external ring which is adapted to act as a locator for said internal collar of said sleeve in order to determine the upward stroke limit position of the bush, said bush forming, together with said sleeve, an interspace which accommodates a spring which acts by compression and rests in a downward region against said flange of said stem and rests in an upward region against said ring, said spring keeping the bush elastically rested against said internal collar so as to enclose, together with the base plate, said cavity for receiving the dose of plastic material to be molded.

3. The mold according to claim 2, wherein the internal wall of said bush has a first guiding portion on said stem and a second guiding portion for said sleeve which has a larger diameter than said first portion, said first and second portions being mutually separated by a shoulder which forms said abutment for the edge of said sleeve.

* * * * *